United States Patent
Lee et al.

(10) Patent No.: US 12,210,775 B2
(45) Date of Patent: Jan. 28, 2025

(54) APPARATUS AND METHOD FOR DRIVING REDUNDANT ARRAY OF INDEPENDENT DISKS (RAID) ENGINE

(71) Applicant: Silicon Motion, Inc., Zhubei (TW)

(72) Inventors: Lien-Yu Lee, Zhubei (TW); Shen-Ting Chiu, Miaoli County (TW)

(73) Assignee: SILICON MOTION, INC., Zhubei (TW)

( * ) Notice: Subject to any disclaimer, the term of this patent is extended or adjusted under 35 U.S.C. 154(b) by 313 days.

(21) Appl. No.: 17/984,691

(22) Filed: Nov. 10, 2022

(65) Prior Publication Data

US 2023/0205461 A1  Jun. 29, 2023

(30) Foreign Application Priority Data

Dec. 23, 2021 (CN) .......................... 202111588211.8

(51) Int. Cl.
*G06F 3/06* (2006.01)
(52) U.S. Cl.
CPC .......... *G06F 3/0659* (2013.01); *G06F 3/0619* (2013.01); *G06F 3/0656* (2013.01); *G06F 3/0689* (2013.01)
(58) Field of Classification Search
CPC .... G06F 3/0659; G06F 3/0619; G06F 3/0656; G06F 3/0689
See application file for complete search history.

(56) References Cited

U.S. PATENT DOCUMENTS

| 2019/0163571 A1 | 5/2019 | Cheng |
| 2019/0171522 A1 | 6/2019 | Chang et al. |
| 2020/0285411 A1 | 9/2020 | Cheng |
| 2022/0269561 A1* | 8/2022 | Yoo ........................ G06F 3/0619 |

FOREIGN PATENT DOCUMENTS

| TW | 201926042 A | 7/2019 |
| TW | 201926043 A | 7/2019 |
| TW | 201926059 A | 7/2019 |

\* cited by examiner

*Primary Examiner* — Baboucarr Faal
(74) *Attorney, Agent, or Firm* — Birch, Stewart, Kolasch & Birch, LLP

(57) ABSTRACT

The invention is related to an apparatus and a method for driving redundant array of independent disks (RAID) engine. The method, performed by a RAID controller in a RAID pre-processor, including: completing a driving operation for performing a series of physical-layer signal interactions with a RAID engine according to a driving value in the configuration register. The driving value corresponds to a command issued by a processing unit. The processing unit performs an operation irrelevant from an encoding or a decoding of a parity of a page group in parallel of the driving operation by the RAID controller in coordination with the RAID engine.

19 Claims, 6 Drawing Sheets

| P#0 | ECC#0 |
|---|---|
| P#1 | ECC#1 |
| P#2 | ECC#2 |
| P#3 | ECC#3 |
| P#4 | ECC#4 |
| P#5 | ECC#5 |
| P#6 | ECC#6 |
| Parity Page | ECC(Parity) |

FIG. 1

APPARATUS AND METHOD FOR DRIVING REDUNDANT ARRAY OF INDEPENDENT DISKS (RAID) ENGINE

CROSS-REFERENCE TO RELATED APPLICATIONS

This application claims the benefit of priority to Patent Application No. 202111588211.8, filed in China on Dec. 23, 2021; the entirety of which is incorporated herein by reference for all purposes.

BACKGROUND

The disclosure generally relates to storage devices and, more particularly, to apparatuses and methods for driving a redundant array of independent disks (RAID) engine.

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation).

A flash controller typically employs error correcting code (ECC) to correct error bits in user data over channels or in memory cells. The flash controller encodes the user data with redundant information in the form an ECC in data writes. The redundancy allows the flash controller to correct a limited number of error bits that may occur anywhere in the user data in data reads without re-read. To prevent a critical error of user data pages including too many error bits that cannot be recovered, the flash controller sets a predetermined number of pages to form a page group, and generates parities according to the user data pages of the page group. Typically, the NAND flash device may be equipped with a dedicated RAID engine to calculate parities across data pages of a page group. However, it spends lots of time and computation resources to drive the RAID engine. Thus, it is desirable to have apparatuses and methods for driving the RAID engine to improve overall system performance.

SUMMARY

In an aspect of the invention, an embodiment of an apparatus for driving a redundant array of independent disks (RAID) engine is introduced to include: a command queue; a mapping table; a converter; a configuration register and a RAID controller. The command queue is arranged operably to store a plurality of commands pushed by a processing unit, where each command comprises an operation code and a first parameter to instruct the apparatus to perform a physical-layer interaction with the RAID engine. The mapping table comprises a plurality of records and each record stores a driving value associated with a specific operation code and a specific parameter for driving an interface interacting with the RAID engine. The converter, coupled to the command queue and the mapping table, is arranged operably to obtain a corresponding driving value from the mapping table according to the operation code and the parameter of any command out of the command queue. The configuration register is arranged operably to store the driving value obtained from the converter. The RAID controller, coupled to the configuration register, is arranged operably to perform a series of physical-layer signal interactions with the RAID engine according to the driving value in the configuration register.

In another aspect of the invention, an embodiment of a method, performed by a RAID controller in a RAID pre-processor, for driving a RAID engine is introduced to include a step for: completing a driving operation for performing a series of physical-layer signal interactions with a RAID engine according to a driving value in the configuration register. The driving value corresponds to a command issued by a processing unit. The processing unit performs an operation irrelevant from an encoding or a decoding of a parity of a page group in parallel of the driving operation by the RAID controller in coordination with the RAID engine.

Both the foregoing general description and the following detailed description are examples and explanatory only, and are not restrictive of the invention as claimed.

BRIEF DESCRIPTION OF THE DRAWINGS

FIG. 1 is a schematic diagram illustrating logical data organization of data pages, parity page and Error Correcting Code (ECC).

DETAILED DESCRIPTION

Figure 2:
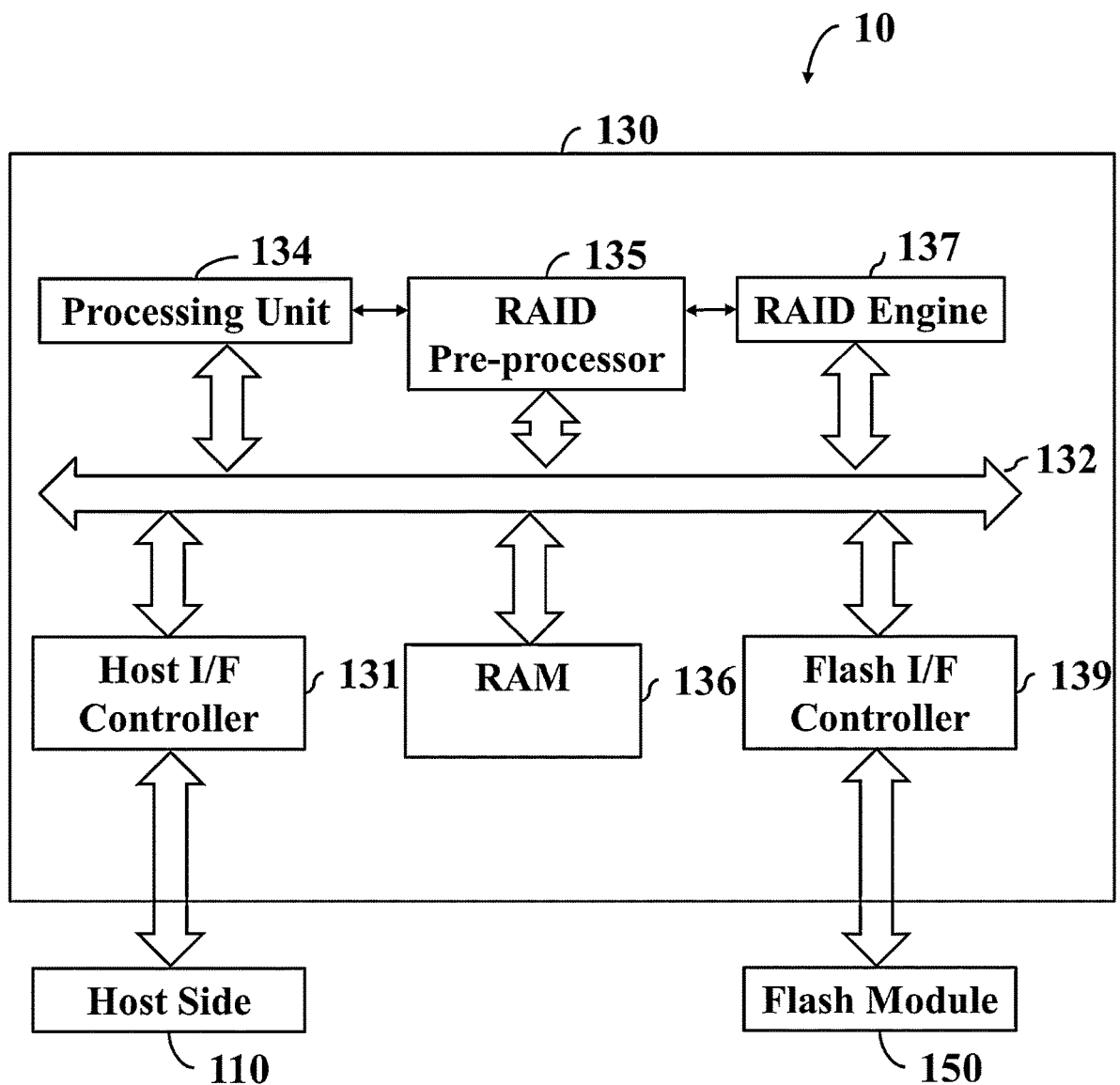
FIG. 2 is the system architecture of an electronic apparatus according to an embodiment of the invention.

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

To reach the fault tolerance of user data, a flash controller may generate error correcting code (ECC) according to user data of each page, and program the user data together with the ECC into a flash module, so that in the future, user data containing error bits read from the flash module can be corrected. The ECC may be Low-Density Parity Check Code (LDPC), Bose-Chaudhuri-Hocquenghem Code (BCH), or others. Taking 1 KB user data as an example, BCH code can be used to correct at most 72 error bits while LDPC can be used to correct at most 128 error bits. However, the user data of the read page may contain more error bits than that can be corrected with the ECC. Therefore, the flash controller may set a predetermined number of pages to form a page group and generates a parity page according to the user data of the page group. Refer to the exemplary data organization as shown in FIG. 1. Pages P #0 to P #6 form a page group. Each page contains 4096 bytes of user data and ECC generated from the user data. For example, the notation ECC #0 stands for the ECC of the page P #0, the notation ECC #1 stands for the ECC of the page P #1, and so on. It is to be understood that the examples of FIG. 1 show the perspective of logical representation, the invention should not be limited to physically store user data pages with their ECC, and parity page with its ECC of one page group in the same physical block of a flash module. To optimize the overall system performance, user data pages with their ECC, and parity page with its ECC of one page group may be distributed to store in physical blocks of Logical Number Units (LUNs) in different channels parallelly, and the invention should not be limited thereto. Data of the parity page may be generated by Equation 1:

$$P_j = d_{p0,j} \oplus d_{p1,j} \oplus d_{p2,j} \oplus d_{p3,j} \oplus d_{p4,j} \oplus d_{p5,j} d_{p6,j}$$

where j is an arbitrary integer ranging from 0 to 4095, p0 represents the $0^{th}$ page, p1 represents the $1^{st}$ page, p2 represents the $2^{nd}$ page, and so on, Pj represents the jth data bit of the parity page, $d_{p0,j}$ represents the $j^{th}$ data bit of the $0^{th}$ page, $d_{p1,j}$ represents the $j^{th}$ data bit of the $1^{st}$ page, $d_{p2,j}$ represents the $j^{th}$ data bit of the $2^{nd}$ page, and so on. If error bits of one page cannot be corrected with the corresponding ECC, then the flash controller may omit this page and generate the corrected user data of this page by applying XOR operations on data bits of the other pages and the parity page of the same page group. Suppose that the error bits of the $1^{st}$ page cannot be corrected with the corresponding ECC, data bits of the error page may be recovered by Equation 2:

$$d_{p1,j} = d_{p0,j} \oplus d_{p2,j} \oplus d_{p3,j} \oplus d_{p4,j} \oplus d_{p5,j} d_{p6,j} \oplus P_j$$

The parity of a page group may also be referred to as Redundant Array of Independent Disks (RAID) ECC according to its functions. Although 4K-bit pages are used as an example above, this is only for illustration, and those artisans would apply to encode that containing fewer or more bits per page, such as 512-, 1K-, 2K-, 8K-, 16K-bit page, etc.

Typically, the NAND flash device is equipped with a dedicated redundant array of independent disks (RAID) engine for calculating parities for page groups. In some implementations, a processing unit when loading and executing firmware drives the RAID engine to complete the calculations. However, the processing unit takes lots of time and computing resources to control the physical signals of the physical layer for communicating with the RAID engine, and to wait for the time for the RAID engine to complete operations when directly driving the RAID engine.

Refer to FIG. 2. The electronic apparatus 10 includes a host side 110, a flash controller 130 and a flash module 150, and the flash controller 130 and the flash module 150 may be collectively referred to as a device side. The electronic apparatus 10 may be equipped with a Personal Computer (PC), a laptop PC, a tablet PC, a mobile phone, a digital camera, a digital recorder, or other consumer electronic products. The host side 110 may communicate with a host interface (I/F) controller 131 of the flash controller 130 each other over Universal Serial Bus (USB), Advanced Technology Attachment (ATA), Serial Advanced Technology Attachment (SATA), Peripheral Component Interconnect Express (PCI-E), Universal Flash Storage (UFS), Embedded Multi-Media Card (eMMC) interface, or others with a relevant protocol. A flash interface (I/F) controller 139 of the flash controller 130, and the flash module 150 may communicate with each other by a Double Data Rate (DDR) protocol, such as Open NAND Flash Interface (ONFI), DDR Toggle, or others. The flash controller 130 includes a processing unit 134, and the processing unit 134 may be implemented in numerous ways, such as with general-purpose hardware (e.g., a single processor, multiple processors or graphics processing units capable of parallel computations, or others) that is programmed using firmware and/or software instructions to perform the functions recited herein. The processing unit 134 receives host commands, such as read commands, write commands, erase commands, etc. through the host interface controller 131, schedules and executes the commands. The flash controller 130 additionally includes Random Access Memory (RAM) 136, such as a Dynamic Random Access Memory (DRAM), a Static Random Access Memory (SRAM), or the combination thereof, for allocating space as a data buffer for storing user data (also referred to as host data) on pages that is read from the host side 110 and to be written into the flash module 150, and parity bits (also referred to as a parity) of a page group. The RAM additionally allocates space for storing user data on pages that is read from the flash module 150 and to be output to the host side 110, and storing ECC and parity bits that are read from the flash module 150 and used in a data correction process. The RAM 136 may additionally store necessary data in execution, such as variables, data tables, data abstracts, host-to-flash (H2F) tables, flash-to-host (F2H) tables, or others. The flash interface controller 139 includes a NAND flash controller (NFC) to provide functions that are required to access to the flash module 150, such as a command sequencer, an ECC encoder, an ECC decoder, etc. The ECC encoder is used to generate ECC according to the content of one user-data page or one RAID ECC page.

The flash controller 130 may be equipped with the bus architecture 132, which is used to couple components to each other to transmit data, addresses, control signals, etc. The components include the host I/F controller 131, the processing unit 134, the RAID pre-processor, 135, the RAM 136, the RAID engine 137, the flash I/F controller 139, and others. The bus includes a set of parallel physical-wires connected to two or more components of the flash controller 130. The bus is a shared transmission medium so that only two components can access to the wires to communicate with each other for transmitting data at any one time. Data and control signals travel in both directions between the components along data and control lines, respectively. Addresses on the other hand travel only one way along address lines. For example, when the processing unit 134 wishes to read data from a particular address of the RAM 136, the processing unit 134 sends this address to the RAM 136 on the address lines. The data of that address is then returned to the processing unit 134 on the data lines. To complete the data read operation, control signals are sent along the control lines.

The flash controller 130 is equipped with the RAID ECC engine 137 including XOR gates and registers for completing the calculations of the above Equations 1 and 2, and the like. The flash controller 130 further includes the RAID pre-processor 135, coupled to the RAM 136 through the bus architecture 132, which is responsible for reading user data or a parity from a designated address of the RAM 136 or storing user data or a parity in a designated address of the RAM 136. The RAID pre-processor 135 may be coupled to the processing unit 134 through the native processor bus, and to the RAID engine 137 through the native RAID bus, rather than communicating with the processing unit 134 and the RAID engine 137 through the bus architecture 132. For example, the RAID pre-processor 135 and the RAID engine are employed to support an encoding procedure, a decoding procedure, a terminate procedure, a resume procedure, and so on. With reference to FIG. 1, in an encoding procedure, the host OF controller 131 may receive user data of pages P #0 to P #6 from the host side 110, and store the user data in a designated address of the RAM 136 through the bus architecture 132. The RAID pre-processor 135 may read the user data of pages P #0 to P #6 from the designated address of the RAM 136 page by page, thereby enabling the RAID engine 137 to perform the XOR operation on the read pages to generate a parity of one parity page. Subsequently, the RAID pre-processor 135 may store the parity of the parity page in a designated address of the RAM 136 through the bus architecture 132.

A decoding procedure is triggered when the flash I/F controller 139 reads the user data of pages P #0 to P #6 from the flash module 150, stores the read one in a designated address of the RAM 136 and discovers that the error bits in the page P #1 cannot be corrected with corresponding ECC. In the decoding procedure, the flash I/F controller 139 may read the parity of the corresponding parity page from a designated address of the flash module 150 and store the parity in a designated address of the RAM 136 through the bus architecture 132. The RAID pre-processor 135 may read the user data of pages P #0, P #2 to P #6, and the parity of the parity page from the designated addresses of the RAM 136 page by page, thereby enabling the RAID engine 137 to perform the XOR operations on the read pages to generate the user data of page P #1. Subsequently, the RAID pre-processor 135 may store the user data of page P #1 in a designated address of the RAM 136 through the bus architecture 135.

Suppose that the RAID engine 137 is interrupted after encoding the user data of pages P #0 to P #3 completely: In the terminate procedure, the RAID pre-processor 135 may store the intermediate encoding results of pages P #0 to P #3 generated by the RAID engine 137 in a designated address of the RAM 136 through the bus architecture 132. A resume procedure is triggered after the RAID pre-processor 135 is instructed to resume the previously interrupted encoding. In the resume procedure, the RAID pre-processor 135 may read the intermediate encoding results of pages P #0 to P #3, and the user data of pages P #4 to P #6 from the designated addresses of the RAM 136 page by page through the bus architecture 132, thereby enabling the RAID engine 137 to perform XOR operation on the read pages to generate the parity of the parity page. Subsequently, the RAID pre-processor 135 may store the parity of the parity page in a designated address of the RAM 136 through the bus architecture 132.

Before the execution of above procedures, the RAID pre-processor 135 may inform the RAID engine 137 to perform the initialization operation to switch group, clear data of the current group, set the working mode, and so on.

The flash module 150 provides huge storage space typically in hundred Gigabytes, or even several Terabytes, for storing a wide range of user data, such as high-resolution images, video files, etc. The flash module 150 includes control circuitry and memory arrays containing memory cells, which may be configured as Single Level Cells (SLCs), Multi-Level Cells (MLCs), Triple Level Cells (TLCs), Quad-Level Cells (QLCs), or any combinations thereof. The processing unit 134 programs user data, ECC, parities or any combinations thereof into a designated address (a destination address) of the flash module 150 and reads user data, ECC, parities or any combinations thereof from a designated address (a source address) of the flash module 150 through the flash I/F controller 139. The flash I/F controller 139 may use several electronic signals including a data line, a clock signal line and control signal lines for coordinating the command, address and data transfer with the flash module 150. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 3:
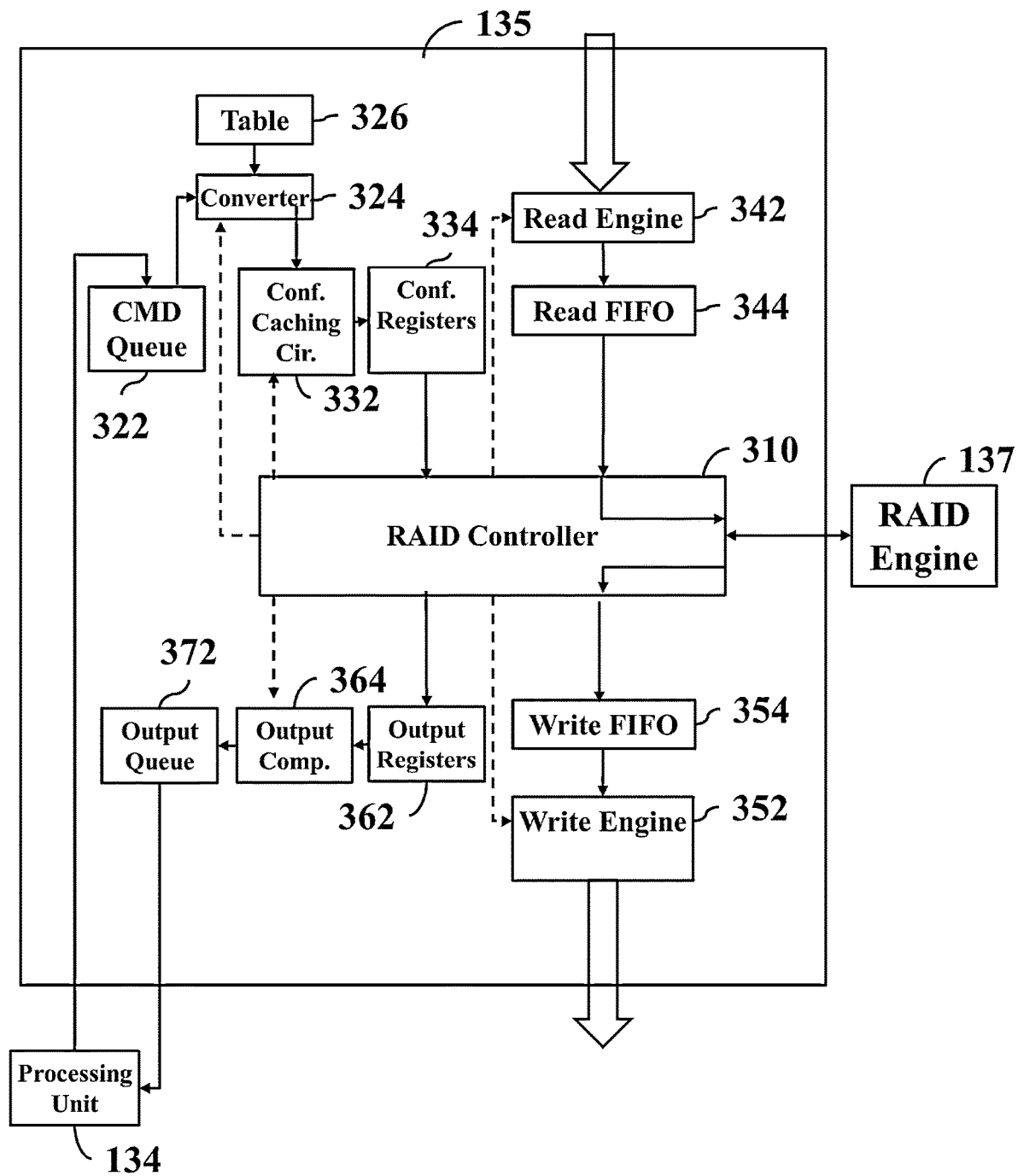
FIG. 3 is a block diagram of a redundant array of independent disks (RAID) pre-processor according to an embodiment of the invention.
Figure 4:
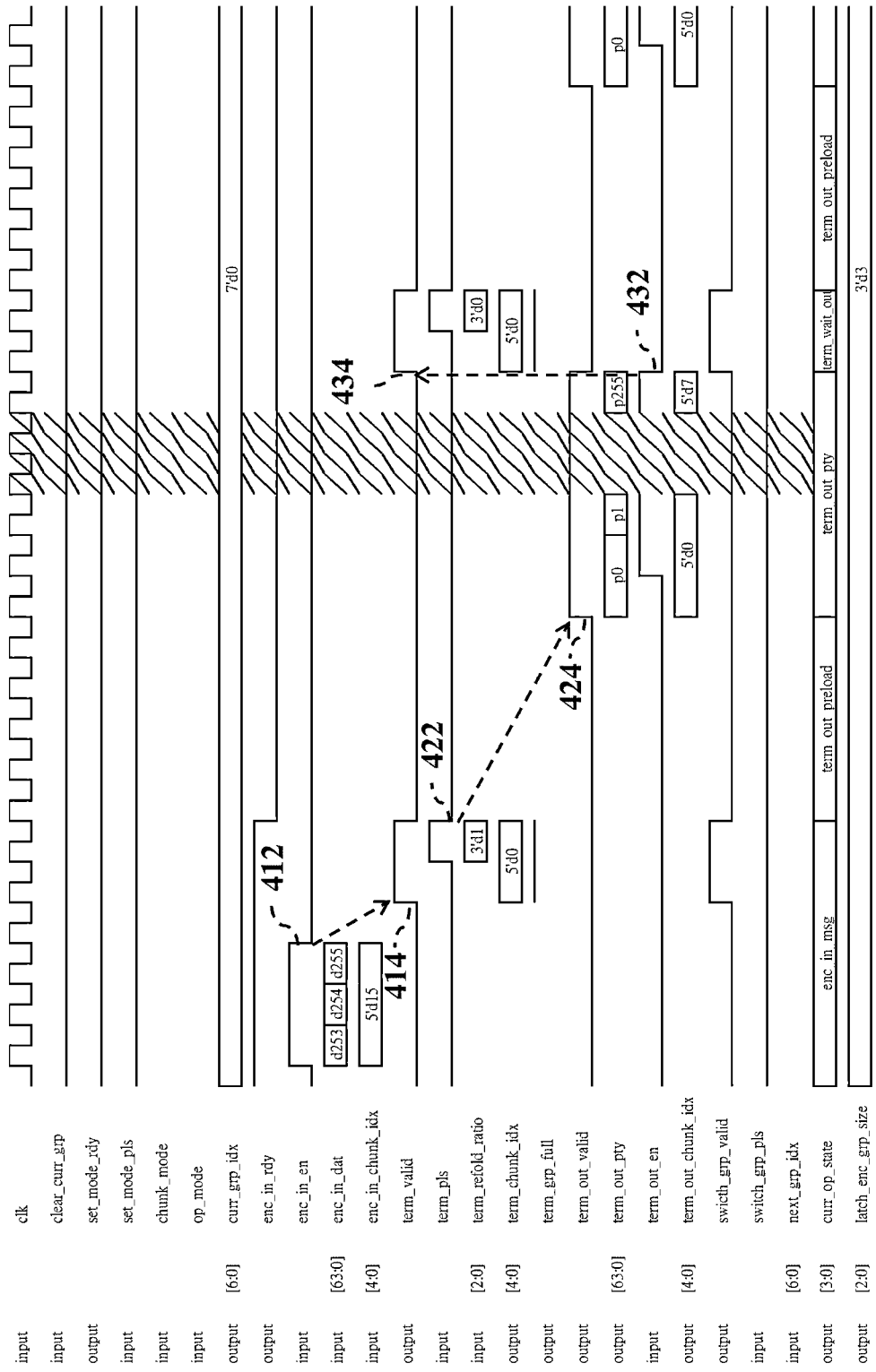
FIG. 4 is a timing diagram illustrating a terminate procedure according to an embodiment of the invention.

Refer to FIG. 3 illustrating the hardware block diagram of the RAID pre-processor 135. The RAID pre-processor 135 includes the RAID controller 310 for assisting the firmware executed by the processing unit 134 to schedule operations in each procedure and to transmit and receive signals to and from the RAID engine 137. Refer to FIG. 4 illustrating the timing diagram of a terminate procedure. For example, the RAID controller 310 detects the assertion 414 of the terminate valid "term_valid" issued by the RAID engine 137 for confirming that the RAID engine 137 has entered the terminate procedure and activated the output of intermediate encoding result of the first batch after one clock subsequent to the output of the de-assertion 412 of the encode input enabled "enc_in_en" to the RAID engine 137. The RAID controller 310 receives the assertion 424 of the terminate output valid "term_out_valid" for a predefined time period, enabling the RAID controller 310 to receive the intermediate encoding result of the first batch during the time period, after 5 clocks subsequent to the output of the de-assertion 422 of the terminate pulse "term_pls" to the RAID engine 137. The RAID controller 310 detects the assertion 434 of the terminate valid "term_valid" issued by the RAID engine 137 to confirm that the RAID engine 137 is going to output the intermediate encoding result of the second batch while outputting the de-assertion 432 of the terminate output valid "term_out_valid" to the RAID engine 137. In the previous implementation, the processing unit (not shown) needs to spend a continuous period of time to detect the input signals from the RAID engine (not shown), and control the analog circuitry of corresponding interface to output the signals to the RAID engine (not shown), until the entire terminate procedure is completed.

To reduce the consumption of time and computation resource for driving the RAID engine 137, the RAID pre-processor 135 includes the command queue 322, which allows the processing unit 134 to store high-level commands for driving the RAID engine 137. Each command contains an 8-bit operation code and a 24-bit parameter to instruct an interaction of physical layer with the RAID engine 137. The processing unit 134 assigns a unique command number to each command for identification. The processing unit 134 goes to execute other tasks without waiting for the completions of high-level commands after pushing the high-level commands into the command queue 322. In other words, the RAID controller 310 is employed to handle a series of corresponding signal interactions for all commands in the command queue 322 and store execution results in the output queue 372 after the completions of corresponding signal interactions with the RAID engine 137, thereby enabling the processing unit 134 to obtain the execution results of the high-level commands from the output queue 372. The RAID pre-processor 135 includes the converter 324 and the mapping table 326. The mapping table 326 includes multiple records and each record stores setting values (may be referred to as low-level driving values) for driving the interface connecting with the RAID engine 137, which corresponds to the specific operation code and parameter of the high-level command. The converter 324 obtains the designated setting values from the mapping table 326 according to the operation code and the parameters in any high-level command and sets the values in the designated registers of the configuration caching circuitry 332. For example, to initialize the RAID engine 137, the processing unit 134 may push four commands into the command queue 322, and the exemplary commands are shown in Table 1 as follows:

TABLE 1

| Operation Code | First Parameter | Second Parameter | Third Parameter | Description |
| --- | --- | --- | --- | --- |
| 0x01 | N/A | N/A | next_grp_idx | Switch to a designated group |
| 0x02 | N/A | N/A | N/A | Clear data for the previous group |
| 0x03 | dec_grp_size | (res_grp_full, 2'h0, res_chunk_idx) | (chunk_mode, 5'h0, op_mode) | Set a working mode |
| 0xF0 | N/A | N/A | N/A | Activate the DMA controller in the RAID engine |

The four commands are used to instruct the RAID engine 137 to switch to a designated group, clear data for the previous group, set a working mode and not to activate the direct memory access (DMA) controller in the RAID engine 137. The converter 324 obtains setting values from the mapping table 326 with reference to the operation code and the parameters of the four commands in the command queue 322 in sequence and sets the values to the designated registers in the configuration caching circuitry 332.

Figure 5:
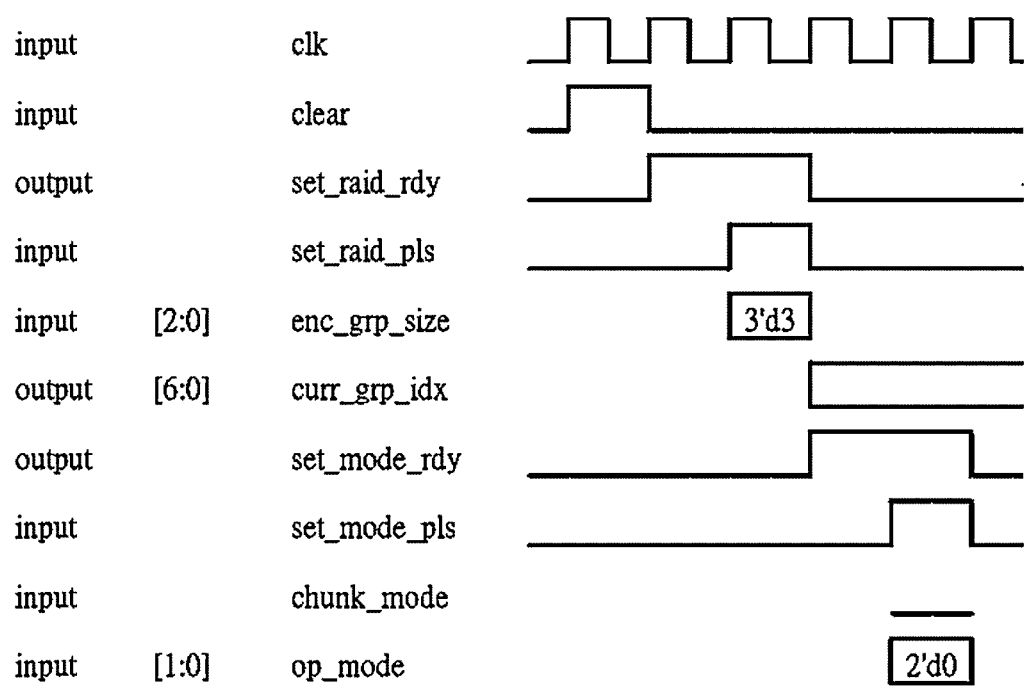
FIG. 5 is a timing diagram between a RAID controller and a RAID engine for initializing the RAID engine according to an embodiment of the invention.

The RAID controller 310 issues a triggering signal to the configuration caching circuitry 332 and the converter 324 each time after a series of physical-layer signal interactions with the RAID engine 137 have completed to perform a designated driving operation. The output component of the configuration caching circuitry 332 outputs the setting values in the registers of the configuration caching circuitry 332 to the configuration registers 324 to overwrite the setting values in the configuration register 234 after detecting the triggering signal. The converter 324 pops the command out of the head of the command queue 322, obtains the corresponding setting values from the mapping table 326 and sets the setting values to the registers in the configuration caching circuitry 332 according to the operation code and the parameters of the command after detecting the triggering signal. For example, assume that at time point t0, the configuration registers 334 store the driving values associated with the first command in Table 1, the registers in the configuration caching circuitry 332 store the driving values associated with the second command in Table 1 and the command queue 322 stores the third and the fourth commands in Table 1 in sequence. The RAID controller 310 after performing a series of physical-layer signal interactions with the RAID engine 137 according to the driving values in the configuration registers 334 at time point t1 issues a triggering signal to the configuration caching circuitry 332 and the converter 324, so that the output component in the configuration caching circuitry 332 outputs the driving values associated with the second command in Table 1 to the configuration registers 334, and the converter 324 pops the third command in Table 1 out of the head of the command queue 322, obtains the driving values from the mapping table 326 according to the operation code and the parameters of the third command and sets the driving values to the registers in the configuration caching circuitry 332. The RAID controller 310 after performing a series of physical-layer signal interactions with the RAID engine 137 according to the driving values in the configuration registers 334 at time point t2 issues a triggering signal to the configuration caching circuitry 332 and the converter 324, and the remaining can be deduced by analogy accordingly. In accordance with the commands in Table 1, FIG. 5 illustrates a timing diagram between the RAID controller 310 and the RAID engine 137 for initializing the RAID engine 137 according to an embodiment of the invention.

In the encoding procedure, the decoding procedure or the resume procedure, the RAID controller 310 issues a triggering signal with related parameters in accordance with the driving values in the configuration registers 334 to the read engine 342 to instruct the read engine 342 to read user data of one or more pages, a parity of one page group, or intermediate encoding results from a designated address of the RAM 136. The read engine 342 obtains the user data of designated page(s), the parity of the page group, or the intermediate encoding results and stores them in the read first-in first-out buffer (also referred to as FIFO in short) 344. Subsequently, the RAID controller 310 obtains the user data of designated page(s), the parity of the page group, or the intermediate encoding results from the read FIFO 344 and transmits them to the RAID engine 137 through the data lines "enc_dat_in".

In the decoding procedure or the terminate procedure, the RAID controller 310 obtains intermediate encoding results of one or more pages or a parity of one page group from the RAID engine 137 through the data lines "enc_dat_out" according to the driving values in the configuration registers 344 and stores them in the write FIFO 354. Subsequently, the RAID controller 310 issues a triggering signal with related parameters to the write engine 352 to instruct the write engine 352 to write the intermediate encoding results of page(s) or the parity of the page group in a designated address of the RAM 136. The write engine 352 obtains the intermediate encoding results of page(s) or the parity of the page group from the write FIFO 354 and writes them in the designated address of the RAM 136 through the bus architecture 132.

The RAID controller 310 issues a triggering signal to the output component 364 and stores execution results to the output registers 362 each time after performing a series of physical-layer signal interactions with the RAID engine 137 and obtaining the execution results from the RAID engine 137. The execution results may include a command number, an interrupted page number, and so on. The output component 364 pushes the execution results in the output registers 362 into the tail of the output queue 372 after detecting the triggering signal.

Figure 6:
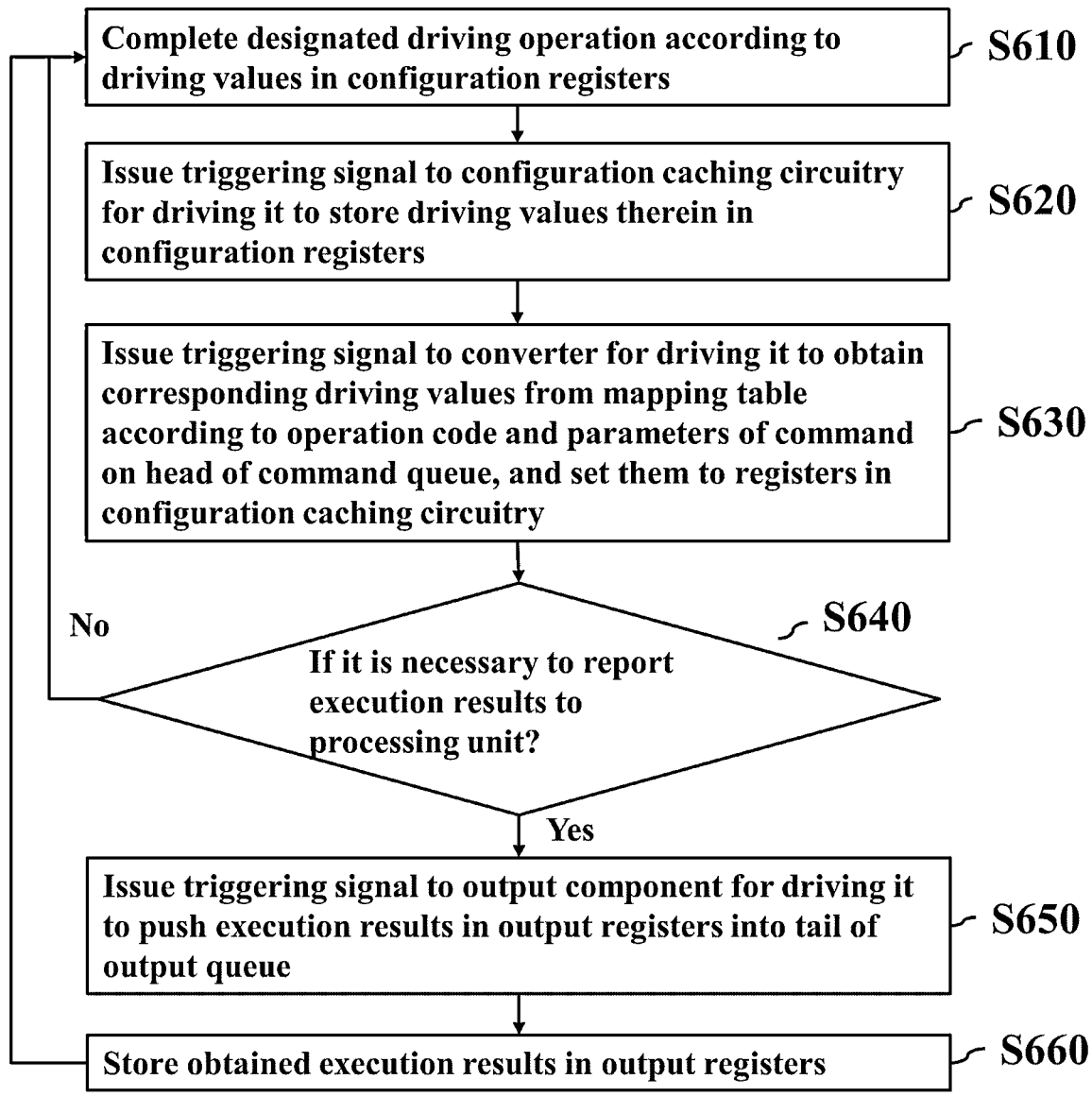
FIG. 6 is a flowchart illustrating a method for driving the RAID engine according to an embodiment of the invention.

To conform to the hardware architecture of the RAID pre-processor 135, an embodiment of the invention introduces a method for driving the RAID engine 137, performed by the RAID controller 310. Refer to FIG. 6. Detailed steps are illustrated as follows:

Step S610: A designated driving operation is completed according to driving values in the configuration registers 334. The driving values in the configuration registers 334 correspond to a command issued by the processing unit 134. The processing unit 134 may perform an operation irrelevant from the encoding and the decoding of parities of the page groups in parallel that the RAID controller 310 coordinates with the RAID engine 137 to complete the driving operation.

In some embodiments, the RAID controller 310 may perform a series of physical-layer signal interactions with the RAID engine 137 to complete the designated driving operation according to the driving values in the configuration register 334.

In some embodiments of the encoding procedure, the decoding procedure or the resume procedure, the RAID controller 310 may instruct the read engine 342 to read user data of one or more pages, a parity of one page group, or intermediate encoding results from a designated address of the RAM 136 through the bus architecture 132 according to the driving values in the configuration registers 334 and to store the user data of page(s), the parity of the page group, or the intermediate encoding results in the read FIFO 344. After a predefined time period, the RAID controller 310 obtains the user data of page(s), the parity of the page group, or the intermediate encoding results from the read FIFO 344. Subsequently, the RAID controller 310 performs a series of physical-layer signal interactions with the RAID engine 137 for transmitting the user data of page(s), the parity of the page group, or the intermediate encoding results to the RAID engine 137 through the data lines.

In some embodiments of the encoding procedure, the decoding procedure or the terminate procedure, the RAID controller 310 may perform a series of physical-layer signal interactions with the RAID engine 137 to receive user data of one or more pages, intermediate encoding results, or a parity of one page group from the RAID engine 137 according to driving values in the configuration registers 334, and store the user data of the page(s), the intermediate encoding results, or the parity of the page group in the write FIFO 354. Subsequently, the RAID controller 310 instructs the write engine 352 to write the user data of the page(s), the intermediate encoding results, or the parity of the page group in a designated address of the RAM 136 through the bus architecture 132.

Step S620: A triggering signal is issued to the configuration caching circuitry 332 for driving the configuration caching circuitry 332 to store driving values therein in the configuration registers 334.

Step S630: A triggering signal is issued to the converter 324 for driving the converter 324 to obtain corresponding driving values from the mapping table 326 according to the operation code and the parameters of a command on the head of the command queue 322, and setting the driving values to the registers in the configuration caching circuitry 332.

Step S640: It is determined whether it is necessary to report execution results to the processing unit 134. If so, the process proceeds to step S650. Otherwise, the process proceeds to step S610 to start the next driving operation.

Step S650: A triggering signal is issued to the output component 364 for driving the output component 364 to push the execution results in the output registers 362 into the tail of the output queue 372. It is noted that, since a command number is included in the execution results, the processing unit 134 can map to a specific command previously pushed into the command queue 322 by using the command number.

Step S660: The obtained execution results are stored in the output registers 362.

Although the embodiment has been described as having specific elements in FIGS. 2 and 3, it should be noted that additional elements may be included to achieve better performance without departing from the spirit of the invention. Each element of FIGS. 2 and 3 is composed of various circuitry and arranged operably to perform the aforementioned operations. While the process flows described in FIG. 6 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for driving a redundant array of independent disks (RAID) engine, comprising:
   a command queue, arranged operably to store a plurality of commands pushed by a processing unit, wherein each command comprises an operation code and a first parameter to instruct the apparatus to perform a physical-layer interaction with the RAID engine;
   a mapping table, comprising a plurality of records, wherein each record stores a driving value associated with a specific operation code and a specific first parameter for driving an interface interacting with the RAID engine;
a converter, coupled to the command queue and the mapping table, arranged operablyto obtain a corresponding driving value from the mapping table according to the operation code and the first parameter of any command out of the command queue;
a configuration register, arranged operably to store the driving value obtained from the converter; and
a RAID controller, coupled to the configuration register, arranged operably to perform a series of physical-layer signal interactions with the RAID engine according to the driving value in the configuration register,
wherein the driving value corresponds to a command issued by a processing unit, and the processing unit performs an operation irrelevant from an encoding or a decoding for a parity of a page group in parallel of the driving operation by the RAID controller in coordination with the RAID engine.

2. The apparatus of claim 1, comprising:
a read buffer;
a read engine, coupled to the read buffer;
wherein the RAID controller is coupled to the read buffer and the read engine, and is arranged operably to: issue a first triggering signal with a second parameter to the read engine according to the driving value in the configuration register for instructing the read engine to read user data, a parity or an intermediate encoding result from a first address of a random access memory (RAM) and store the user data, the parity or the intermediate encoding result in the read buffer; read the user data, the parity or the intermediate encoding result from the read buffer; and transmit the user data, the parity or the intermediate encoding result to the RAID engine through a data line.

3. The apparatus of claim 2, wherein the user data, the parity or the intermediate encoding result is read from the read buffer after a predefined time period from an issuance of the first triggering signal to the read engine.

4. The apparatus of claim 2, wherein an issuance of the first triggering signal with the second parameter to the read engine, a reading of the user data from the read buffer, and a transmission of the user data to the RAID engine are performed during an encoding procedure.

5. The apparatus of claim 2, wherein an issuance of the first triggering signal with the second parameter to the read engine, a reading of the user data or the parity from the read buffer, and a transmission of the user data or the parity to the RAID engine are performed during a decoding procedure.

6. The apparatus of claim 2, wherein an issuance of the first triggering signal with the second parameter to the read engine, a reading of the user data or the intermediate encoding result from the read buffer, and a transmission of the user data or the intermediate encoding result to the RAID engine are performed during a resume procedure.

7. The apparatus of claim 1, comprising:
a write buffer;
a write engine, coupled to the write buffer;
wherein the RAID controller is coupled to the write buffer and the write engine, and is arranged operably to: obtain user data of a page, an intermediate encoding result or a parity from the RAID engine through a data line according to the driving value in the configuration register; store the user data of the page, the parity or the intermediate encoding result in the write buffer; and issue a second triggering signal with a third parameter to the write engine for instructing the write engine to read the user data of the page, the parity or the intermediate encoding result from the write buffer and write the parity or the intermediate encoding result in a second address of a random access memory (RAM).

8. The apparatus of claim 7, wherein an obtaining of the user data of the page from the RAID engine, a storing of the user data of the page in the write buffer, and an issuance of the second triggering signal with the third parameter to the write engine are performed during a decoding procedure.

9. The apparatus of claim 7, wherein an obtaining of the intermediate encoding result from the RAID engine, a storing of the intermediate encoding result in the write buffer, and an issuance of the second triggering signal with the third parameter to the write engine are performed during a terminate procedure.

10. The apparatus of claim 1, comprising:
a configuration caching circuitry, coupled to the converter and the configuration register, comprising an output component and a register,
wherein the RAID controller is arranged operably to: after completing an operation for driving the RAID engine according to the driving value in the configuration register, issue a third triggering signal to the configuration caching circuitry for driving the output component to output a driving value in the register to the configuration register; and issue a fourth triggering signal to the converter for driving the converter to obtain a new command from the command queue, obtain a new driving value from the mapping table according to a new operation code and a new parameter of the new command and set the new driving value to the register in the configuration caching circuitry.

11. The apparatus of claim 1, comprising:
an output queue, coupled to the RAID controller,
wherein the RAID controller is arranged operably to: after completing the physical-layer signal interactions with the RAID engine, output an execution result corresponding to the command to the output queue.

12. The apparatus of claim 1, comprising:
an output component, coupled to the output queue and the RAID controller,
wherein the RAID controller is arranged operably to: after completing the physical-layer signal interactions with the RAID engine, output a fifth triggering signal to the output component for driving the output component to push a first execution result in the output register to the output queue; and store a second execution result corresponding to the command in the output register.

13. A method for driving a redundant array of independent disks (RAID) engine, wherein a RAID pre-processor comprises a RAID controller and a configuration register, the method comprising:
storing, by a command queue, a plurality of commands pushed by a processing unit, wherein each command comprises an operation code and a first parameter to instruct an apparatus to perform a physical-layer interaction with the RAID engine;
providing a mapping table, comprising a plurality of records, wherein each record stores a driving value associated with a specific first parameter for driving an interface interacting with the RAID engine;
obtaining, by a converter coupled to the command queue and the mapping table, a corresponding driving value from the mapping table according to the operation code and the first parameter of any command out of the command queue;

storing, by the configuration register, the driving value obtained from the converter;

completing, by the RAID controller, a driving operation for performing a series of physical-layer signal interactions with a RAID engine according to the driving value in the configuration register, wherein the driving value corresponds to a command issued by a processing unit, and the processing unit performs an operation irrelevant from an encoding or a decoding for a parity of a page group in parallel of the driving operation by the RAID controller in coordination with the RAID engine.

14. The method of claim 13, wherein the RAID preprocessor comprises a read engine and a read buffer, the method comprising:

instructing the read engine to read user data of at least one page, a parity or an intermediate encoding result from a random access memory (RAM) according to the driving value in the configuration register, and store the user data of the page(s), the parity or the intermediate encoding result in the read buffer;

after a predefined time period, obtaining the user data of the page(s), the parity or the intermediate encoding result from the read buffer; and performing the series of physical-layer signal interactions with the RAID engine to transmit the user data of the page(s), the parity or the intermediate encoding result to the RAID engine through a data line.

15. The method of claim 14, wherein the steps for instruction, obtaining and performing are performed during an encoding procedure, a decoding procedure or a resume procedure.

16. The method of claim 13, wherein the RAID preprocessor comprises a write engine and a write buffer, the method comprising:

receiving user data of a page, an intermediate encoding result or a parity from the RAID engine by performing the series of physical-layer signal interactions with the RAID engine according to the driving value in the configuration register;

storing the user data of the page, the intermediate encoding result or the parity to the write buffer; and instructing the write engine to write the user data of the page, the intermediate encoding result or the parity to the write buffer in a random access memory (RAM).

17. The method of claim 16, wherein the steps for receiving, storing and instructing are performed during an encoding procedure, a decoding procedure or a terminate procedure.

18. The method of claim 13, wherein the RAID preprocessor comprises a configuration caching circuitry, a command queue, a converter and a mapping table, the method comprising:

after completing the driving operation, issuing a first triggering signal to the configuration caching circuitry for driving an output component in the configuration caching circuitry to output a driving value in a register of the configuration caching circuitry to the configuration registry; and after completing the driving operation, issuing a second triggering signal to the converter for driving the converter to obtain a corresponding driving value from the mapping map according to an operation code and a parameter in a command on a head of the command queue, and set the corresponding driving value to the register of the configuration caching circuitry.

19. The method of claim 13, wherein the RAID preprocessor comprises an output queue, the method comprising:

after completing the driving operation, determining whether it is necessary to report an execution result corresponding to the command to the processing unit; and pushing the execution result into the output queue when it is necessary to report the execution result to the processing unit, thereby enabling the processing unit to obtain the execution result from the output queue.

* * * * *